Oct. 16, 1956  W. J. MARTINY  2,767,340
ROTOR FOR INDUCTION MOTOR
Filed June 20, 1955
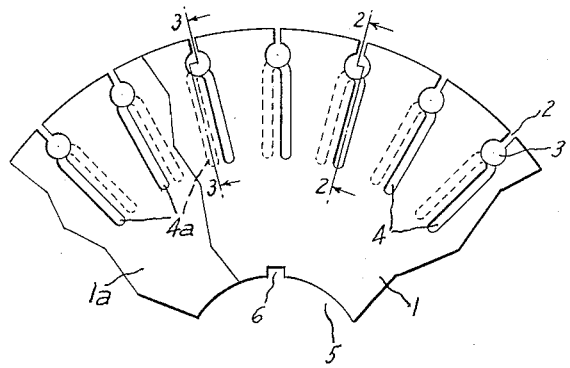
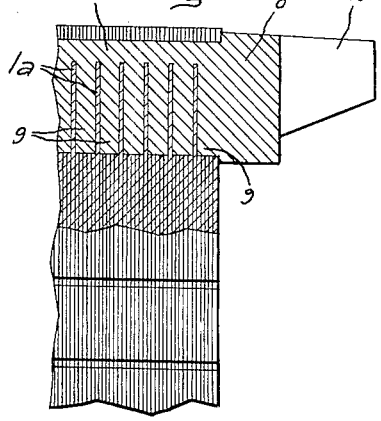
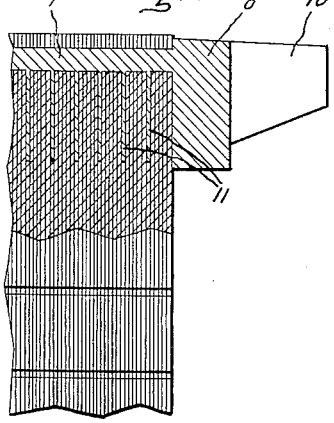
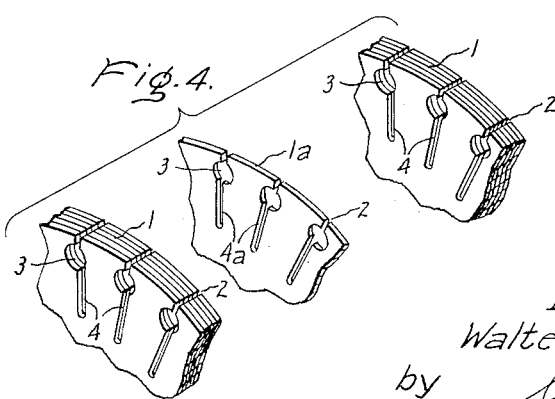
Inventor:
Walter J. Martiny,
by Claude H. Mott.
His Attorney.

United States Patent Office 2,767,340
Patented Oct. 16, 1956

2,767,340

ROTOR FOR INDUCTION MOTOR

Walter J. Martiny, Ballston Lake, N. Y., assignor to General Electric Company, a corporation of New York Application June 20, 1955, Serial No. 516,505

2 Claims. (Cl. 310—212)

The present invention relates to rotors for alternating current induction motors and more particularly to a rotor having a cast squirrel cage winding of relatively high resistance and low reactance.

In the design of electric motors for applications where the power source is limited or in such operations as where rapid reversing or stalled torque operation is required, it is essential to utilize a high slip rotor, that is to say a rotor having from 5% to 13% slip at full load. Such a high resistance rotor permits starting the motor under load from a low voltage source or when the voltage at the source is reduced due to high voltage regulation resulting from the high current being taken by the motor at that time. It is also important at such times that the reactance of the rotor winding be as low as possible to provide the highest power factor for the motor under starting conditions to limit the total current requirements thereof. This combination of features minimizes the starting current requirements of the power source. However, increasing the resistance of the rotor winding results in an increase in the heat developed therein and therefore results in heat dissipation problems and differential expansion problems. For example, in the past it has been necessary to utilize an expensive brazed rotor bar construction wherein bars of conducting material are placed in the winding slots of the motor and are brazed to a fabricated end ring construction to obtain the necessary shear strength to withstand the shear stresses imposed on the brazed junction therebetween due to the higher temperature rise and the higher coefficient of expansion of the end ring than the laminations. Because of the high resistance of the rotor bars, the amount of heating produced therein during operation is greatly increased over that of slow-slip rotor constructions and require a stronger mechanical connection between the rotor bars and the end ring. This invention contemplates the reinforcement of the end ring junction with the rotor boxes and also provides means whereby the heat storage capacity of the rotor windings is increased and the capability of the windings to transfer heat to the magnetic material of the core is likewise increased to decrease the temperature differential between the rotor laminations and the end rings to reduce the shear forces tending to shear the end rings from the rotor bars.

Accordingly, a principal object of this invention is to provide a construction for squirrel cage rotors having cast windings of high resistance combined with high heat storage capacity and high heat transfer characteristics.

Another object of this invention is to provide a cast squirrel cage rotor winding in which the junction between the rotor bars and the end rings are reinforced to increase their maximum shear capacity.

A more specific object of this invention is to provide a squirrel cage rotor having a cast winding in which means are provided for increasing the heat storage capacity and the heat transfer from the rotor bars to the laminations without increasing the resistance or the reactance of the winding and without increasing the length of the rotor.

Further objects and advantages will become apparent and this invention will become better understood by reference to the following description which refers to the accompanying drawings, and the features of novelty which characterize this invention are set forth in claims annexed to and forming part of this specification.

In the drawing

Fig. 1 is a partial end view of rotor laminations arranged and designed according to this invention, Fig. 2 is a fragmentary sectional view along the line 2—2 of Fig. 1, Fig. 3 is a fragmentary sectional view along the line 3—3 of Fig. 1, and Fig. 4 is a fragmentary exploded view of rotor laminations arranged according to my invention.

Generally speaking, a rotor for an induction motor formed of laminations having winding slots having a bulb portion adjacent the outer periphery of the laminations and a tail portion extending radially inwardly toward the center of the lamination is provided. The tail portion is offset from a radial line through the center of the bulb portion. By reversing a lamination at selected intervals along the length of the rotor and aligning the bulb portions of the laminations, the winding cast in the rotor slots is uninterrupted throughout the bulb portion and is interrupted at spaced intervals along the tail portion of the winding slots. By properly selecting the interval at which the laminations are reversed, substantially no current will pass through the tail portion of each bar and the high resistance of the bulb portion is substantially unaffected by the added cross section of the tail portion of the winding. However, the cast material in the tail portion of each bar increases the mass of the bar and thus increases the heat storage capacity thereof. Further by providing a very large surface area in contact with the magnetic material of the rotor, the heat transfer from the rotor bars to the magnetic laminations of the rotor is increased to reduce the temperature differential therebetween. In addition, the tail portion which joins the end ring greatly reinforces the junction between the end ring and rotor bar to increase its capacity to withstand shear loads so that the construction can successfully withstand the shear stresses imposed at this junction during operation.

As shown in the drawing, the rotor of the present invention has a laminated cylindrical core generally similar to the usual construction built up of a plurality of stacked circular laminations or punchings 1 having peripheral slots 2 adjacent the outer periphery of the laminations for the rotor winding. Slots 2 are provided with a bulb portion 3 which may be of any suitable size and shape to provide a cross section which will result in a winding to provide a full load slip of from 5% to 13%. Extending inwardly from the bulb portion 3 of each winding slot and slightly offset from a radial line through the center of the bulb portion 3 of each slot 2 is a tail portion 4. Each lamination has a central opening 5 which may be provided with a keyway 6 to properly align the laminations so that the bulb portions 2 of the slots register to form longitudinal slots in the core which are preferably skewed longitudinally in the usual manner. The central openings 5 of the laminations form a bore for mounting the rotor on a shaft (not shown).

To obtain the improved construction of the present invention, a plurality of laminations indicated by the numeral 1a are stacked in a manner at intervals along the length of the rotor with the bulb portions 3 of laminations 1 and 1a aligned as indicated in Fig. 1. The tail portions 4a of the reversed laminations 1a are thus not longitudinally aligned with the tail portions 4 of the remainder of the laminations 1.

The squirrel cage winding is then cast into the slots in the usual manner, that is, molds are placed at opposite ends of the core and, a sleeve is placed over its outer periphery thereof. The molten metal, which is preferably aluminum or an aluminum alloy, is forced under pressure into the rotor slots 2 to form the rotor bars or conductors 7 in the bulb portions of slots 2, and end rings 8 which join the bars at both ends of the core to form a short-circuited winding and to hold the stack laminations of the core in place. If desired, fan blades 10 may be formed integrally at one or both ends of the rotor.

When the molten metal fills the bulb portions 3 of the slots 2 in the casting operation, it will be apparent that it also fills the tail portions 4 and 4a of the slots 2 as indicated at 9 and 11 in Figs. 2 and 3 respectively. However, since the laminations 1a are reversed, the longitudinal electrical conductive path through the tail portions 9 is interrupted at intervals by the magnetic laminations 1a so that the effective cross section of the bars for conducting electrical currents is substantially the cross section of the bulb portion 3 alone. Because the bulb portion 3 is located adjacent the outer periphery of the core, a rotor bar construction having low reactance under all conditions is provided. Moreover, by incorporating the non-conducting tail portions 9 and 11 of the rotor bars, the heat storage capacity of the rotor bars is increased and the heat generated in the bars is readily conducted away to the laminations to reduce the temperature differential between the bars and the laminations 1.

Tests indicate that when the laminations 1a are reversed at intervals of about ½ to ¼ the length of the bulb portion and the tail portion of the slot, the resistance of the bar is substantially the same as if the tail portion were not utilized. On the other hand, the tail portion increases the mass of the cast rotor bars to increase their heat storage capacity. In addition, the large area of contact between the tail portion of the bar and the magnetic core greatly increased the rate of transfer of heat from the rotor bar to the magnetic core.

As shown in Fig. 2, the tail portion 9 of the bar is also integrally joined to the end rings during the casting operation. This increases the cross section of the junction between the bars and the end ring 8 and increases its shear strength by about three times the shear strength of the junction between bar or bulb portion 2 and the end ring 8 alone. With this increase in the shear strength, the use of a low strength cast material can be utilized.

It should now be apparent that a satisfactory rotor has been provided having a cast squirrel cage winding of low reactance and high resistance by the proper design and placement of rotor slots which have tail portions which conduct substantially no electrical currents, without increasing the length of the rotor. Thus the difficulties and expense of using the brazed end ring construction of the prior practice is avoided.

While one particular embodiment of the invention has been shown and described, modifications thereof will occur to those skilled in the art and it is to be understood, therefore, that this invention is not limited to the particular construction shown and it is intended to include within this invention all equivalent embodiments and modifications which come within the scope of the appended claims.

What I claim as new and desire to secure by Letters Patent of the United States is:

1. A rotor member for an alternating current induction motor, said rotor member comprising a laminated cylinder core formed of a plurality of identical laminations having openings therein to receive a short-circuited winding, each of said openings having an outer bulb portion and a tail portion extending inwardly therefrom, said tail portion being slightly offset from a radial line through the bulb portion, a short-circuited winding comprising longitudinal conductors cast in said openings and end rings connecting said conductors, certain of said laminations being reversed at intervals along the length of the core to interrupt the current path through the portion of the longitudinal conductors disposed in the tail portions of said openings.

2. A rotor member as recited in claim 1, wherein the interval between the reversed laminations is on the order of ¼ to ½ the combined length of the bulb portion and the tail portion of said openings.

References Cited in the file of this patent

FOREIGN PATENTS

| 133,047 | Austria | Apr. 25, 1933 |
| 503,288 | Canada | May 25, 1954 |